(12) United States Patent
Tsutsumi

(10) Patent No.: US 6,556,355 B2
(45) Date of Patent: Apr. 29, 2003

(54) MOUNT CONVERSION ADAPTOR LENS

(75) Inventor: Katsuhisa Tsutsumi, Kawagoe (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/051,067

(22) Filed: Jan. 22, 2002

(65) Prior Publication Data

US 2002/0191302 A1 Dec. 19, 2002

(30) Foreign Application Priority Data

Mar. 26, 2001 (JP) ......................... 2001-086665

(51) Int. Cl.[7] .......................... G02B 15/02; G02B 9/34; G02B 9/58
(52) U.S. Cl. .................. 359/675; 359/781; 359/782
(58) Field of Search ................. 359/675, 781, 359/782

(56) References Cited

U.S. PATENT DOCUMENTS

| | | | | |
|---|---|---|---|---|
| 4,154,508 A | * | 5/1979 | Nakamura | 359/675 |
| 4,253,736 A | * | 3/1981 | Momiyama | 359/675 |
| 4,264,151 A | | 4/1981 | Okano | 359/375 |
| 4,913,537 A | * | 4/1990 | Takase | 359/675 |
| 6,124,981 A | * | 9/2000 | Ogawa | 359/675 |

FOREIGN PATENT DOCUMENTS

| | | | |
|---|---|---|---|
| JP | 55-95920 | * | 7/1980 |
| JP | 11-142732 | | 5/1999 |

* cited by examiner

Primary Examiner—Georgia Epps
Assistant Examiner—William Choi
(74) Attorney, Agent, or Firm—Arnold International; Bruce Arnold

(57) ABSTRACT

An adaptor lens is provided for attachment between a lens of a camera and a camera body, in order to provide the camera with adaptor lens attached, a smaller effective screen size than the camera without the adaptor lens attached. The adaptor lens is formed of, in order from the object side, a front lens group and a rear lens group. The front lens group is formed of, in sequential order from the object side, a negative lens element and at least one meniscus lens element with its concave surface on the object side. The rear lens group is formed of, in sequential order from the object side, a positive lens element with a convex surface on the object side, and a negative lens element. Various conditions are, preferably, satisfied in order to maintain favorable correction of axial chromatic aberration and lateral color.

7 Claims, 14 Drawing Sheets

Spherical Aberration (mm)

Astigmatism (mm)

Distortion

Spherical Aberration (mm)

Astigmatism (mm)

Distortion

Spherical Aberration (mm)

Astigmatism (mm)

Distortion

Spherical Aberration (mm)

Astigmatism (mm)

Distortion

Spherical Aberration (mm)

Astigmatism (mm)

Distortion

Spherical Aberration (mm)

Astigmatism (mm)

Distortion

Spherical Aberration (mm)

Astigmatism (mm)

Distortion

Spherical Aberration (mm)

Astigmatism (mm)

Distortion

Spherical Aberration (mm)

Astigmatism (mm)

Distortion

Spherical Aberration (mm)

Astigmatism (mm)

Distortion

Spherical Aberration (mm)

Astigmatism (mm)

Distortion

Spherical Aberration (mm)

Astigmatism (mm)

Distortion

Spherical Aberration (mm)

Astigmatism (mm)

Distortion

Spherical Aberration (mm)

Astigmatism (mm)

Distortion

Spherical Aberration (mm)

Astigmatism (mm)

Distortion

Spherical Aberration (mm)

Astigmatism (mm)

Distortion

Spherical Aberration (mm)

Astigmatism (mm)

Distortion

Spherical Aberration (mm)

Astigmatism (mm)

Distortion

MOUNT CONVERSION ADAPTOR LENS

BACKGROUND OF THE INVENTION

Conventionally, when attaching an imaging lens to a camera main body which has a different effective screen size and a different mount, a mount conversion adaptor lens must be attached between the imaging lens and the mount. Such an adaptor lens is disclosed in Japanese Laid Open Patent Application 11-142732, which attaches an imaging lens to a camera which has a smaller effective screen size than the proper image size of the lens, and consists of four lens elements of negative, positive, negative, and positive refractive power, in sequential order from the object side. This lens provides a sufficient back focus for insertion of a glass prism between the last element of the lens and the image plane, while favorably correcting the spherical aberration and chromatic aberration which otherwise would be caused by the color separation prism. Because the adaptor lens provides its own magnification (which is unity or higher), there is a problem in that, if the adaptor lens is attached, the composite focal length of the optical system becomes longer and the image angle (i.e., the picture angle) becomes smaller than that of the imaging lens alone.

BRIEF SUMMARY OF THE INVENTION

The object of the present invention is to provide a mount conversion adaptor lens which provides only a small change in the image angle and which favorably corrects the various aberrations even when an imaging lens used for TV broadcasting and so on, is attached to a camera designed for a different image size, using a C mount, or a CS mount.

The mount conversion adaptor lens of the present invention (hereinafter referred to simply as an adaptor lens) is attached between an imaging lens and a mount of a camera and is formed of a front lens group and a rear lens group, in order from the object side. The front lens group includes, in order from the object side, a negative lens element and at least one meniscus lens element with its concave surface on the object side. The rear lens group includes, in sequential order from the object side, a positive lens element with its convex surface on the object side, and a negative lens element.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention relates to a high-performance adaptor lens which makes it possible to attach an imaging lens for TV broadcasting to a so-called C-mount camera or a CS-mount camera (used for monitoring or image reading) by mounting the adaptor lens between the TV broadcasting lens and the camera.

It is preferable that the adaptor lens according to the invention satisfy the following Condition (1):

$$0.5 \leq |fL_{A1}/f| \leq 1.4 \qquad \text{Condition (1)}$$

where $fL_{A1}$ is the focal length of the first lens element of the adaptor lens, in order from the object side, f is the focal length of the adaptor lens.

Moreover, it is also preferable that the adaptor lens be formed of five lens elements and also satisfy the following Condition (2):

$$0.1 \leq |fL_{A4}/fL_{A5}| \leq 0.7 \qquad \text{Condition (2)}$$

where $fL_{A4}$ is the focal length of the fourth lens element of the adaptor lens, in order form the object side, and $fL_{A5}$ is the focal length of the fifth lens element of the adaptor lens, in order from the object side.

Furthermore, if the following Conditions (3) and (4) are also satisfied, the axial chromatic aberration and lateral color can be even more favorably corrected:

$$0.6 \leq |fL_{A1}/f| \leq 1.1 \qquad \text{Condition (3)}$$

$$0.3 \leq |fL_{A4}/fL_{A5}| \leq 0.6 \qquad \text{Condition (4)}$$

where $fL_{A1}$, f, $fL_{A4}$, and $fL_{A5}$ are as previously defined.

Figure 2:
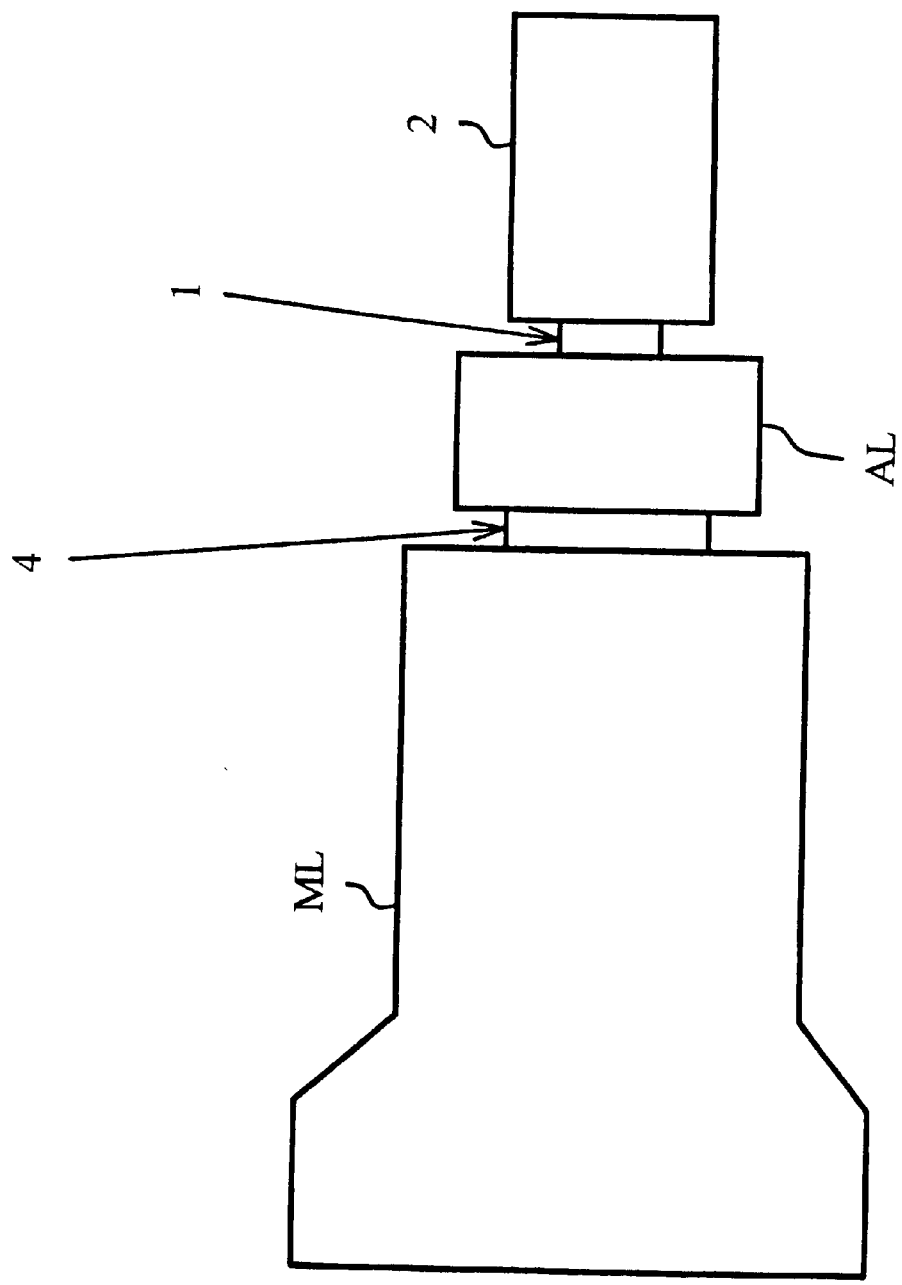
FIG. 2 is a side view, in profile, of the adaptor lens of the invention between a main lens and a single plate camera, and a shows an example of a condition where the adaptor lens of the present invention is used.

An adaptor lens AL of an embodiment of the present invention is explained hereinafter, with reference to the drawings. As shown in FIG. 2, this adaptor lens AL is attached between a main lens ML (such as a zoom lens or a fixed focus lens) and a single plate camera 2 using a C mount (or a CS mount) 1. The main lens ML and the adaptor lens AL may be connected by a bayonet mount 4.

Figure 3:
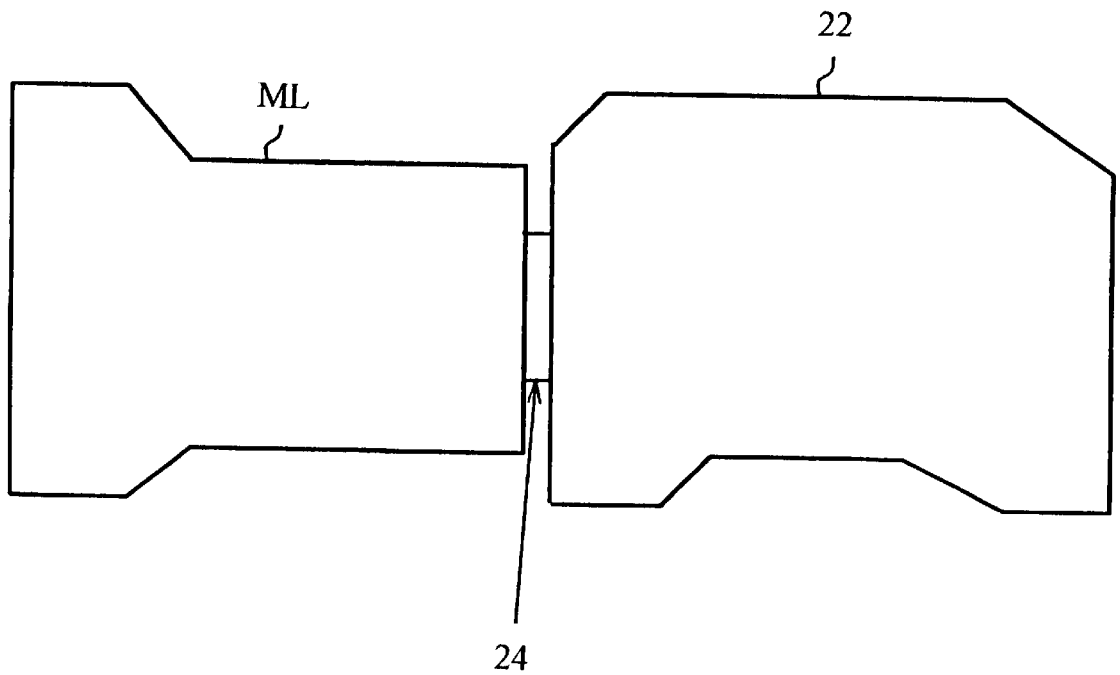
FIG. 3 shows a side view, in profile, of a main lens attached to a TV broadcasting camera by a bayonet mount.

As shown in FIG. 3, when the main lens ML, which is designed for direct attachment to a TV broadcasting camera 22, is attached to a camera having a different screen size (i.e., image size format) via a C mount or a CS mount, this adaptor lens AL adapts the image size of the main lens ML to a smaller format, while maintaining the half-image angle ω almost the same, and also while maintaining favorable correction of the various aberrations. In FIG. 3, the TV broadcasting camera 22 and the main lens ML are connected by a bayonet mount 24.

Figure 1:
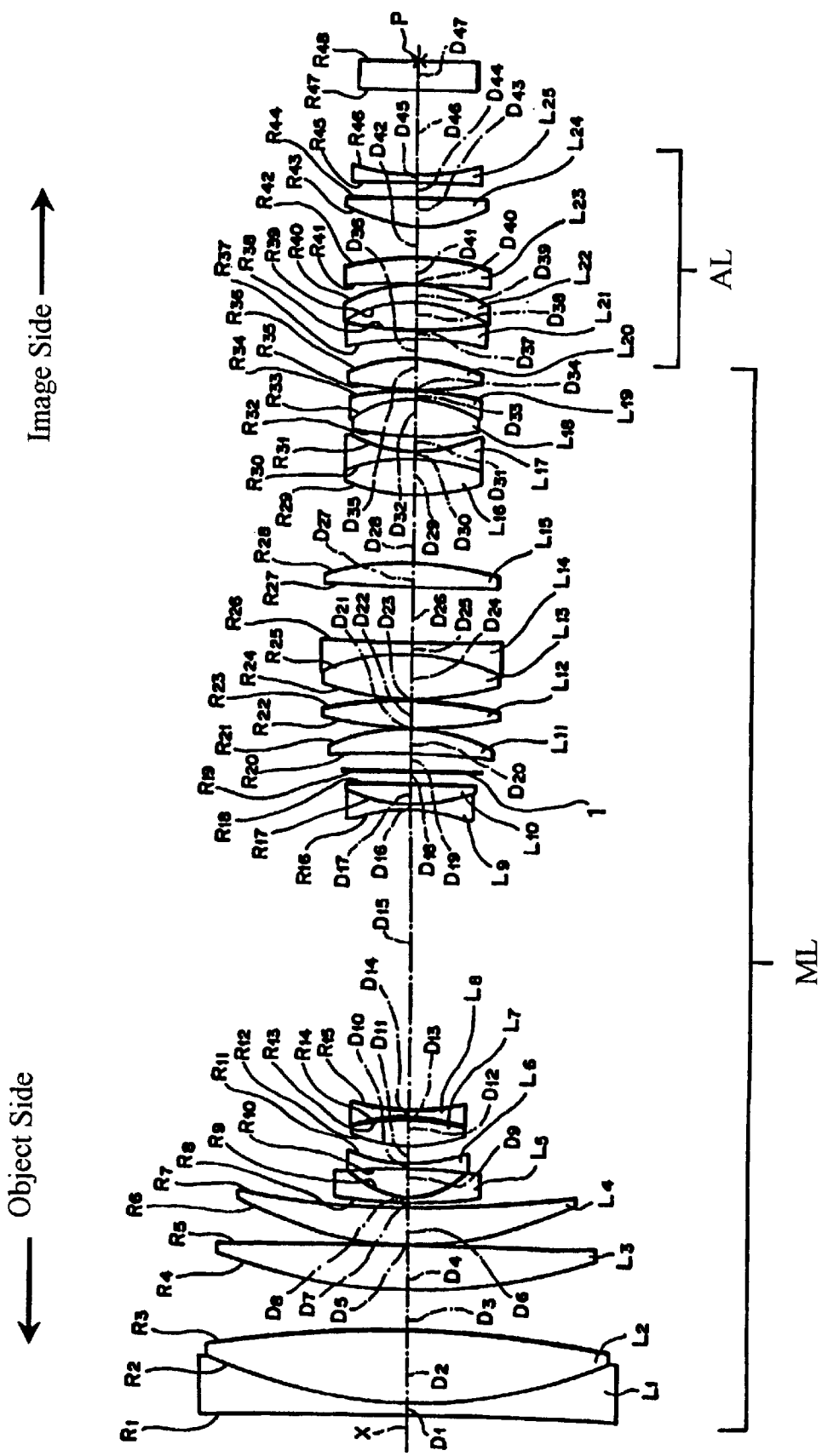
FIG. 1 shows the basic lens element configuration of an adaptor lens of Embodiment 1 of the present invention when attached to the main lens of a camera on the image side of the main lens, i.e., between the main lens and the camera body (not illustrated)

FIG. 1 shows the basic lens element configuration of a main lens ML as well as one example of an adaptor lens AL according to the present invention when attached to the image side of such a main lens. The main lens ML, for example, may be a zoom lens formed of 20 lens elements $L_1$–$L_{20}$ in multiple lens groups. When zooming, the focal length may be changed by moving specified lens groups along the optical axis X so as to change the spacing between the lens groups. A light flux modulated with object information is efficiently converged to an image forming position P on the detection surface of an image detector by this zoom lens, which includes a stop 1.

Table 1 below lists the surface number #, in order from the object side, the radius of curvature R (in mm) of each surface, the on-axis spacing D (in mm) between surfaces, as well as the index of refraction $N_d$ and the Abbe number $\nu_d$ (both at the d line) of each optical element of a representative main lens ML with which the adaptor lens of the invention may be used. In the middle portion of the table are listed the focal length f (in mm) of the main lens alone at each of the wide-angle end, a mid-position, and the telephoto end, as well as the values of the variable lens group spacings (i.e., D7, D15, and D18) of the main lens alone at these zoom positions.

TABLE 1

| # | R | D | $N_d$ | $\nu_d$ |
|---|---|---|---|---|
| 1 | −165.244 | 0.26 | 1.80517 | 25.4 |
| 2 | 9.144 | 1.40 | 1.48749 | 70.2 |
| 3 | −19.890 | 0.77 | | |
| 4 | 11.027 | 0.80 | 1.61772 | 49.8 |
| 5 | −181.768 | 0.01 | | |
| 6 | 6.548 | 0.70 | 1.74319 | 49.3 |
| 7 | 18.816 | D7 (variable) | | |
| 8 | 11.159 | 0.09 | 1.83480 | 42.7 |
| 9 | 1.565 | 0.52 | | |
| 10 | −12.614 | 0.09 | 1.80609 | 40.9 |
| 11 | 3.204 | 0.33 | | |
| 12 | 2.523 | 0.54 | 1.84665 | 23.9 |
| 13 | −3.981 | 0.03 | | |
| 14 | −3.272 | 0.09 | 1.83400 | 37.1 |
| 15 | 5.123 | D15 (variable) | | |
| 16 | −2.746 | 0.09 | 1.79951 | 42.2 |
| 17 | 3.029 | 0.38 | 1.84665 | 23.9 |
| 18 | −135.500 | D18 (variable) | | |
| 19 | ∞ (stop) | 0.35 | | |
| 20 | −15.533 | 0.47 | 1.51454 | 54.6 |
| 21 | −3.228 | 0.01 | | |
| 22 | 8.163 | 0.51 | 1.51454 | 54.6 |
| 23 | −8.163 | 0.02 | | |
| 24 | 5.067 | 0.84 | 1.48749 | 70.2 |
| 25 | −3.807 | 0.22 | 1.80609 | 40.9 |
| 26 | 55.632 | 1.04 | | |
| 27 | 36.960 | 0.50 | 1.51680 | 64.2 |
| 28 | −5.178 | 1.29 | | |
| 29 | 3.349 | 0.71 | 1.53172 | 48.9 |
| 30 | −3.349 | 0.14 | 1.83400 | 37.1 |
| 31 | 2.622 | 0.26 | | |
| 32 | 6.254 | 0.70 | 1.48749 | 70.2 |
| 33 | −2.038 | 0.14 | 1.79951 | 42.2 |
| 34 | −7.276 | 0.02 | | |
| 35 | 7.590 | 0.60 | 1.51824 | 58.9 |
| 36 | −2.765 | | | |

| | f | D7 | D15 | D18 |
|---|---|---|---|---|
| W: | 1.00 | 0.11 | 5.76 | 0.27 |
| M: | 4.00 | 3.86 | 1.56 | 0.71 |
| T: | 16.50 | 5.55 | 0.41 | 0.17 |

The image angle 2ω of the main lens at the wide-angle end is 65.0°.

Figure 14A:
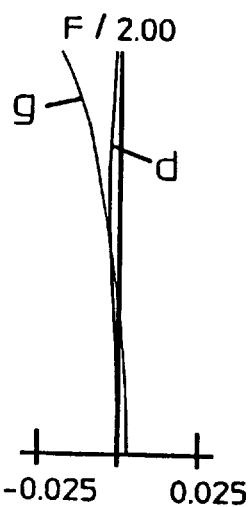
FIGS. 14A–14C show the spherical aberration, astigmatism, and distortion, respectively, of the main lens alone when at the wide-angle end.
Figure 14B:
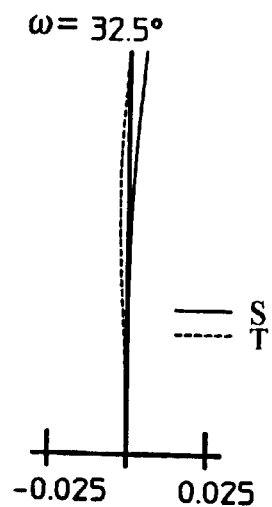
Figure 14C:
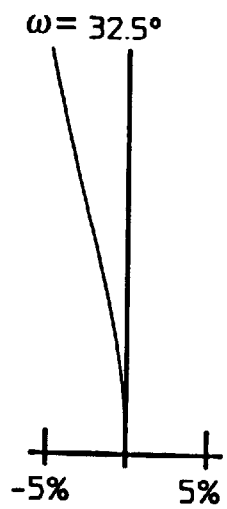
Figure 14D:
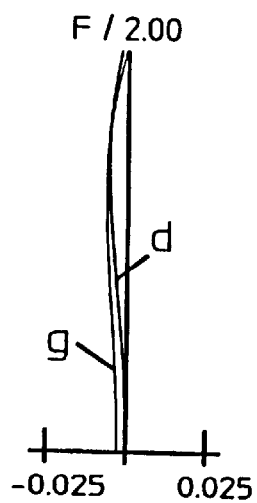
FIGS. 14D–14F show the spherical aberration, astigmatism, and distortion, respectively, of the main lens alone when at a mid-position.
Figure 14E:
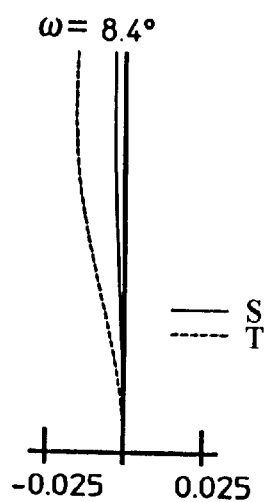
Figure 14F:
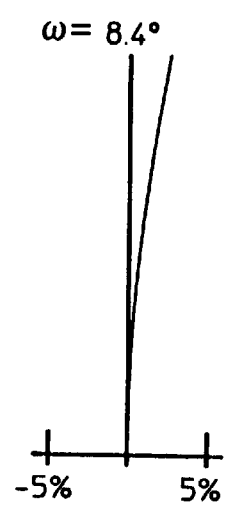
Figure 14G:
FIGS. 14G–14I show the spherical aberration, astigmatism, and distortion, respectively, of the main lens alone when at the telephoto end.
Figure 14H:
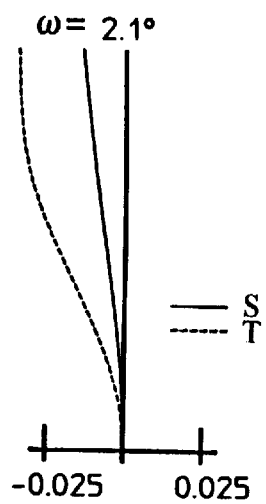
Figure 14I:
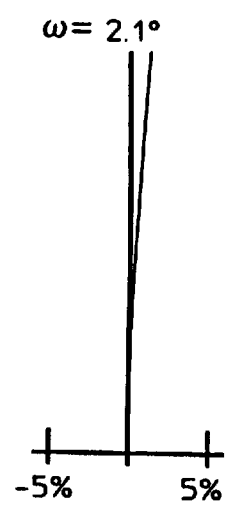

FIGS. 14A–14C show the spherical aberration, astigmatism, and distortion, respectively, of the main lens alone when at the wide-angle end, FIGS. 14D–14F show these aberrations, respectively, at the mid-position, and FIGS. 14G–14I show these aberrations, respectively, at the telephoto end. In these figures ω is the half-image angle. The spherical aberration is given for both the d and the g lines, and the astigmatism is given for both the sagittal S and tangential T image planes. Of course, the adaptor lens of the present invention may be attached to another main lens than the zoom lens discussed above, and may even be attached to a lens of a fixed focal length.

Figure 4:
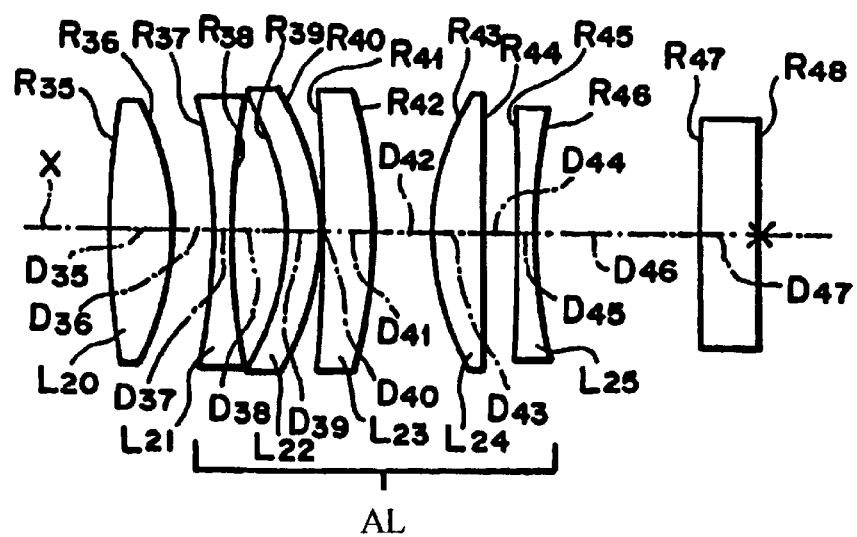
FIG. 4 shows the basic lens element configuration of the adaptor lens of Embodiment 1.

The invention will first be explained in general with reference to one embodiment. FIG. 4 shows the basic lens element configuration of an adaptor lens according to Embodiment 1 of the present invention, which is attached to the image side of a main lens. This adaptor lens is formed of, in sequential order from the object side, a biconcave lens element $L_{21}$, a meniscus lens element $L_{22}$ with its convex surface on the image side (i.e., the side to which a camera may be mounted), a meniscus lens element $L_{23}$ of positive refractive power with its convex surface on the image side, a meniscus lens element $L_{24}$ of positive refractive power with its convex surface on the object side, and a biconcave lens element $L_{25}$ having opposed surfaces of different curvatures, with the surface of smaller radius of curvature on the image side. Also, the adaptor lens of the present invention satisfies the following Conditions (1) and (2):

$$0.5 \leq |fL_{A1}/f| \leq 1.4 \quad \text{Condition (1)}$$

$$0.1 \leq |fL_{A4}/fL_{A5}| \leq 0.7 \quad \text{Condition (2)}$$

where $fL_{A1}$ is the focal length of the first lens element of the adaptor lens, in order from the object side, f is the focal length of the adaptor lens, $fL_{A4}$ is the focal length of the fourth lens element of the adaptor lens, in order from the object side, and $fL_{A5}$ is the focal length of the fifth lens element of the adaptor lens, in order from the object side.

By satisfying Conditions (1) and (2) above, the axial chromatic aberration and lateral color can be favorably corrected.

If the lower limits of Conditions (1) and (2) are not satisfied, the second order spectrum of the axial chromatic aberration changes. On the other hand, if the upper limits of Conditions (1) and (2) are exceeded, the lateral color becomes excessive.

Various embodiments of the invention will now be discussed in detail.

Embodiment 1

Because the basic lens element configuration of Embodiment 1, shown in FIG. 4, was given above in the discussion of the invention in general, additional discussion here will be omitted, except to note that the lens element L22 in this embodiment has weak negative refractive power.

Table 2 below lists the surface number #, in order from the object side, the radius of curvature R (in mm) of each surface, the on-axis spacing D (in mm) between surfaces, as well as the index of refraction $N_d$ and the Abbe number $\upsilon_d$ (both at the d line) of each optical element of an adaptor lens AL according to Embodiment 1 of the present invention, with the surface numbers listed being in order from the object side as counted from the first surface of the main lens, discussed above. In the middle portion of the table are listed the focal length f of the overall combination of the adaptor lens AL of this embodiment when attached to the main lens ML discussed above and the spacing D36 from the last lens element surface of the main lens to the first lens surface of the adaptor lens at each of the wide-angle end W, the mid-position M, and the telephoto end T. In the bottom portion of the table are listed the values which correspond to Conditions (1) and (2) above.

TABLE 2

| # | R | D D36 | $N_d$ | $\upsilon_d$ |
|---|---|---|---|---|
| 37 | −5.592 | 0.15 | 1.64769 | 33.9 |
| 38 | 6.863 | 0.54 | | |
| 39 | −2.468 | 0.33 | 1.58913 | 61.2 |
| 40 | −2.615 | 0.02 | | |
| 41 | −14.833 | 0.50 | 1.71300 | 53.9 |
| 42 | −4.675 | 0.55 | | |
| 43 | 2.622 | 0.50 | 1.81600 | 46.7 |
| 44 | 2985.505 | 0.30 | | |
| 45 | −90.958 | 0.17 | 1.75519 | 27.5 |
| 46 | 5.834 | 1.53 | | |
| 47 | ∞ | 0.55 | 1.51680 | 64.1 |
| 48 | ∞ | | | |

| | f | D36 |
|---|---|---|
| W: | 0.73 | 0.37 |
| M: | 2.91 | 0.37 |
| T: | 12.01 | 0.37 |

| Condition (1) value: $|fL_{A1}/f|$ | = | 0.95 |
|---|---|---|
| Condition (2) value: $|fL_{A4}/fL_{A5}|$ | = | 0.44 |

As is apparent from comparing the above values with the limits given in Conditions (1)–(4), this embodiment meets Conditions (1) and (2), as well as the more stringent Conditions (3) and (4).

Figure 9A:
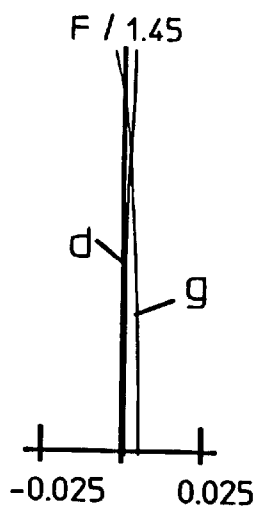
FIGS. 9A–9C show the spherical aberration, astigmatism, and distortion, respectively, of the main lens with the attachment lens of Embodiment 1 attached when at the wide-angle end.
Figure 9B:
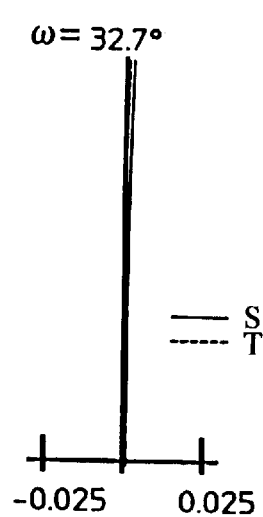
Figure 9C:
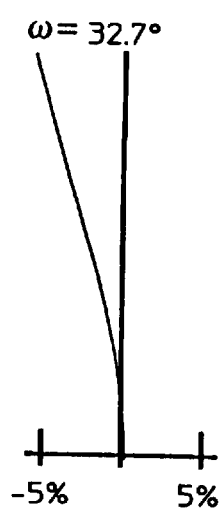
Figure 9D:
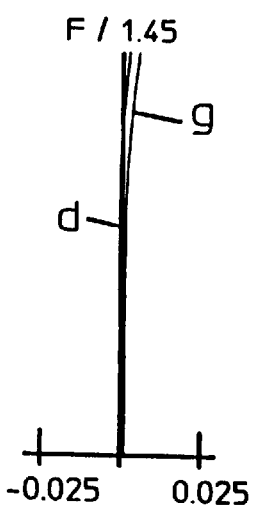
FIGS. 9D–9F show the spherical aberration, astigmatism, and distortion, respectively, of the main lens with the attachment lens of Embodiment 1 attached when at a mid-position.
Figure 9E:
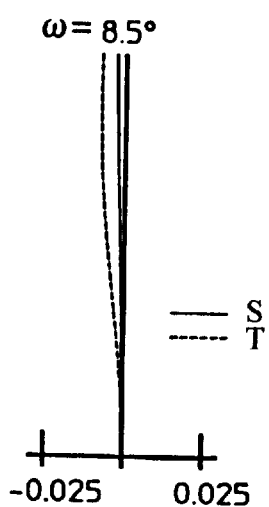
Figure 9F:
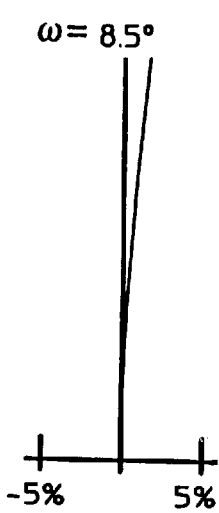
Figure 9G:
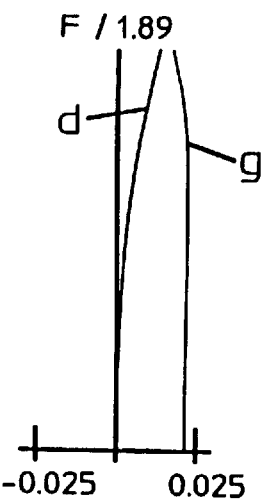
FIGS. 9G–9I show the spherical aberration, astigmatism, and distortion, respectively, of the main lens with the attachment lens of Embodiment 1 attached when at the telephoto end.
Figure 9H:
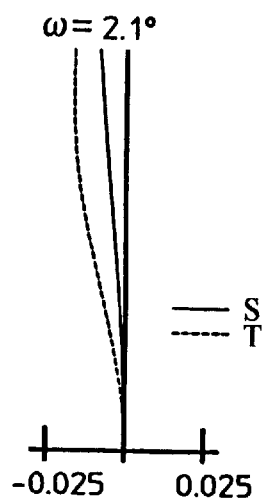
Figure 9I:
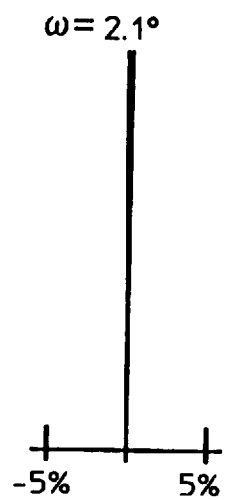

FIGS. 9A–9C show the spherical aberration, astigmatism, and distortion, respectively, of the main lens with the attachment lens of Embodiment 1 attached when at the wide-angle end, FIGS. 9D–9F show these aberrations, respectively, at the mid-position, and FIGS. 9G–9I show these aberrations, respectively, at the telephoto end. In these figures ω is the half-image angle. The spherical aberration is given for both the d and the g lines, and the astigmatism is given for both the sagittal S and tangential T image planes. As is apparent from comparing FIG. 14C with FIG. 9C, whereas the image angle 2ω at the wide-angle end of the main lens alone is 65.0°, when the lens of this embodiment is combined with the main lens as described above, the image angle at the wide-angle end is 65.4°. Thus, the image angle 2ω stays about the same when the attachment lens AL of this embodiment is attached, and the aberrations of the attachment lens are favorably corrected.

Embodiment 2

Figure 5:
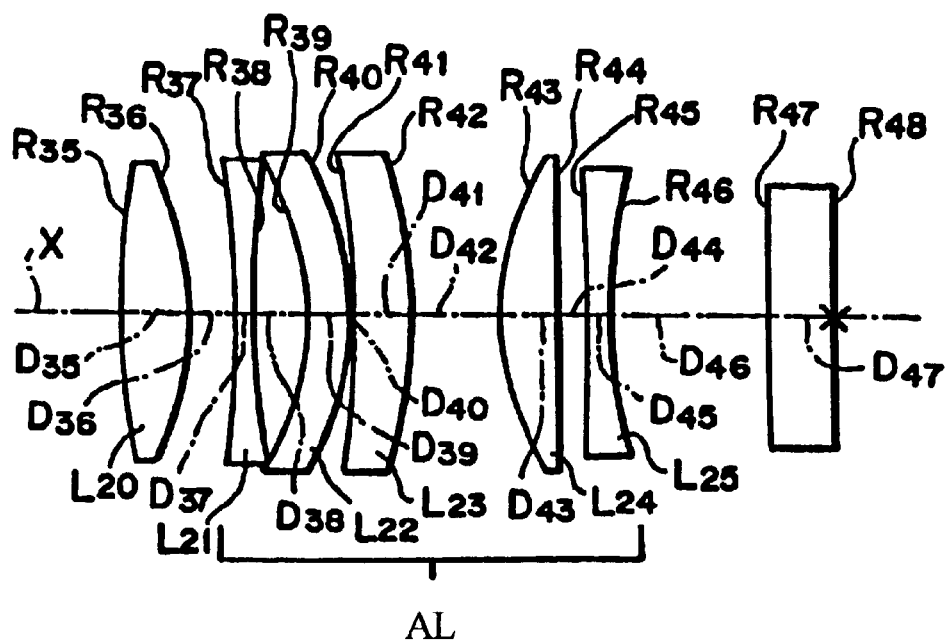
FIG. 5 shows the basic lens element configuration of the adaptor lens of Embodiment 2.

FIG. 5 shows the basic lens element configuration of the adaptor lens of Embodiment 2. The adaptor lens of this embodiment is about the same construction as that of Embodiment 1, except that the lens element $L_{24}$ of this embodiment is biconvex with surfaces of different refractive power, with the surface of smaller radius of curvature on the object side.

Table 3 below lists the surface number #, in order from the object side, the radius of curvature R (in mm) of each surface, the on-axis spacing D (in mm) between surfaces, as well as the index of refraction $N_d$ and the Abbe number $\upsilon_d$ (both at the d line) of each optical element of an adaptor lens AL according to Embodiment 2 of the present invention, with the surface numbers listed being in order from the object side as counted from the first surface of the main lens, discussed above. In the middle portion of the table are listed the focal length f of the overall combination of the adaptor lens AL of this embodiment when attached to the main lens ML discussed above and the spacing D36 from the last lens element surface of the main lens to the first lens surface of the adaptor lens at each of the wide-angle end W, the mid-position M, and the telephoto end T. In the bottom portion of the table are listed the values which correspond to Conditions (1) and (2) above.

TABLE 3

| # | R | D D36 | $N_d$ | $v_d$ |
|---|---|---|---|---|
| 37 | −9.284 | 0.15 | 1.67269 | 32.2 |
| 38 | 8.835 | 0.44 | | |
| 39 | −2.391 | 0.33 | 1.58913 | 61.2 |
| 40 | −2.766 | 0.03 | | |
| 41 | −8.814 | 0.50 | 1.71300 | 53.9 |
| 42 | −4.268 | 0.74 | | |
| 43 | 2.429 | 0.50 | 1.81600 | 46.7 |
| 44 | −70.035 | 0.22 | | |
| 45 | −30.368 | 0.17 | 1.75519 | 27.5 |
| 46 | 4.671 | 1.35 | | |
| 47 | ∞ | 0.55 | 1.51680 | 64.1 |
| 48 | ∞ | | | |

| | f | D36 |
|---|---|---|
| W: | 0.73 | 0.37 |
| M: | 2.91 | 0.37 |
| T: | 12.01 | 0.37 |
| Condition (1) value: $|fL_{A1}/f|$ | = | 1.28 |
| Condition (2) value: $|fL_{A4}/fL_{A5}|$ | = | 0.54 |

As is apparent from comparing the above values given in the lower portion of the table with the limits given in Conditions (1) and (2), this embodiment meets both Conditions (1) and (2).

Figure 10A:
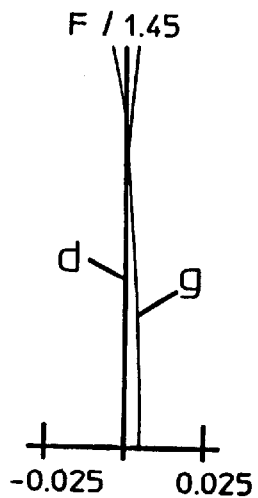
FIGS. 10A–10C show the spherical aberration, astigmatism, and distortion, respectively, of the main lens with the attachment lens of Embodiment 2 attached when at the wide-angle end.
Figure 10B:
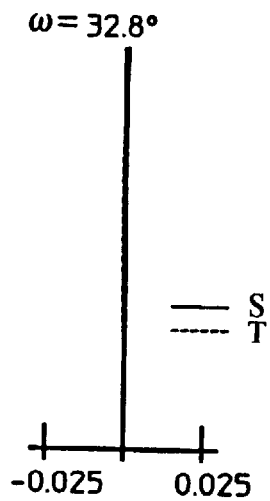
Figure 10C:
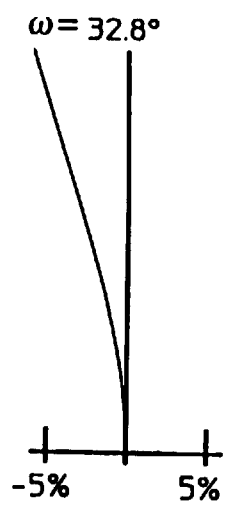
Figure 10D:
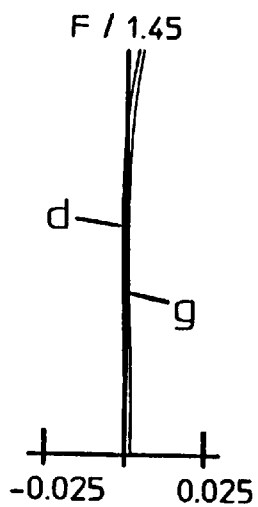
FIGS. 10D–10F show the spherical aberration, astigmatism, and distortion, respectively, of the main lens with the attachment lens of Embodiment 2 attached when at a mid-position.
Figure 10E:
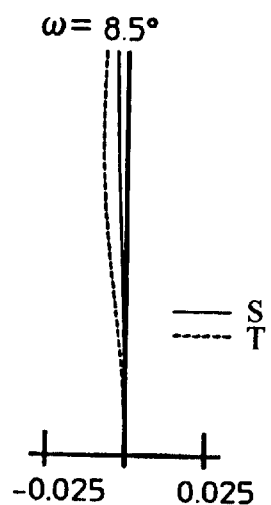
Figure 10F:
Figure 10G:
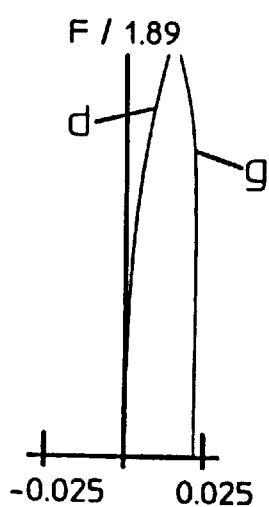
FIGS. 10G–10I show the spherical aberration, astigmatism, and distortion, respectively, of the main lens with the attachment lens of Embodiment 2 attached when at the telephoto end.
Figure 10H:
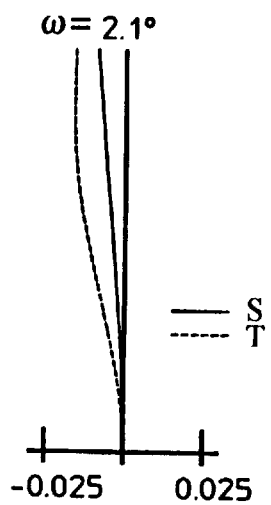
Figure 10I:
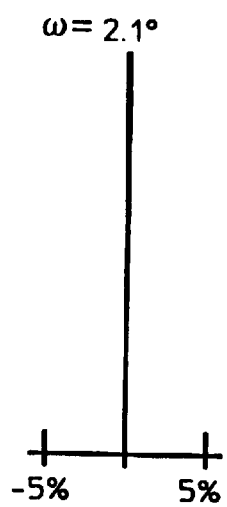

FIGS. 10A–10C show the spherical aberration, astigmatism, and distortion, respectively, of the main lens with the attachment lens of Embodiment 2 attached when at the wide-angle end, FIGS. 10D–10F show these aberrations, respectively, at the mid-position, and FIGS. 10G–10I show these aberrations, respectively, at the telephoto end. In these figures ω is the half-image angle. The spherical aberration is given for both the d and the g lines, and the astigmatism is given for both the sagittal S and tangential T image planes. As is apparent from comparing FIG. 14C with FIG. 10C, whereas the image angle 2ω at the wide-angle end of the main lens alone is 65.0°, when the lens of this embodiment is combined with the main lens as described above, the image angle 2ω at the wide-angle end is 65.6°. Thus, the image angle 2ω stays about the same when the attachment lens AL of this embodiment is attached, and the aberrations of the attachment lens are favorably corrected.

Embodiment 3

Figure 6:
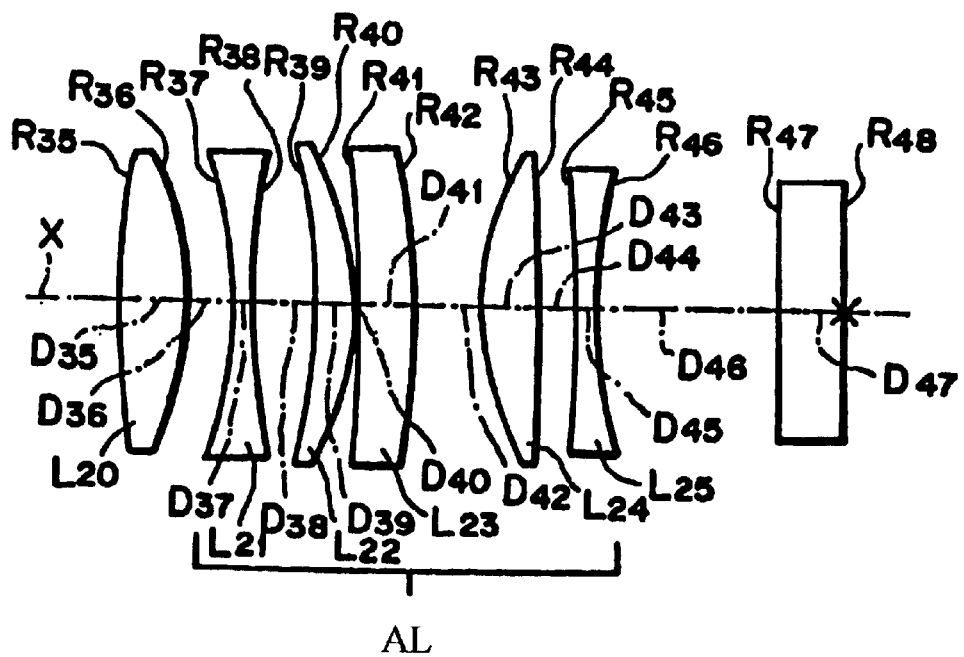
FIG. 6 shows the basic lens element configuration of the adaptor lens of Embodiment 3.

FIG. 6 shows the basic lens element configuration of the adaptor lens of Embodiment 3. The adaptor lens of this embodiment has the same basic lens element configuration as that of Embodiment 2, except that lens element $L_{22}$ in this embodiment is a positive meniscus lens with its concave surface on the object side.

Table 4 below lists the surface number #, in order from the object side, the radius of curvature R (in mm) of each surface, the on-axis spacing D (in mm) between surfaces, as well as the index of refraction $N_d$ and the Abbe number $v_d$ (both at the d line) of each optical element of an adaptor lens AL according to Embodiment 3 of the present invention, with the surface numbers listed being in order from the object side as counted from the first surface of the main lens, discussed above. In the middle portion of the table are listed the focal length f of the overall combination of the adaptor lens AL of this embodiment when attached to the main lens ML discussed above and the spacing D36 from the last lens element surface of the main lens to the first lens surface of the adaptor lens at each of the wide-angle end W, the mid-position M, and the telephoto end T. In the bottom portion of the table are listed the values which correspond to Conditions (1) and (2) above.

TABLE 4

| # | R | D D36 | $N_d$ | $v_d$ |
|---|---|---|---|---|
| 37 | −3.512 | 0.15 | 1.66755 | 41.9 |
| 38 | 7.234 | 0.54 | | |
| 39 | −5.189 | 0.33 | 1.58913 | 61.2 |
| 40 | −2.656 | 0.02 | | |
| 41 | −18.197 | 0.50 | 1.64050 | 60.2 |
| 42 | −6.927 | 0.55 | | |
| 43 | 2.565 | 0.50 | 1.81600 | 46.7 |
| 44 | −23.437 | 0.30 | | |
| 45 | −21.810 | 0.17 | 1.75519 | 27.5 |
| 46 | 4.548 | 1.53 | | |
| 47 | ∞ | 0.55 | 1.51680 | 64.1 |
| 48 | ∞ | | | |

| | f | D36 |
|---|---|---|
| W: | 0.73 | 0.37 |
| W: | 2.91 | 0.37 |
| T: | 12.01 | 0.37 |
| Condition (1) value: $|fL_{A1}/f|$ | = | 0.68 |
| Condition (2) value: $|fL_{A4}/fL_{A5}|$ | = | 0.57 |

As is apparent from comparing the above values with the limits given in Conditions (1)–(4), this embodiment meets Conditions (1) and (2), as well as the more stringent Conditions (3) and (4).

Figure 11A:
FIGS. 11A–11C show the spherical aberration, astigmatism, and distortion, respectively, of the main lens with the attachment lens of Embodiment 3 attached when at the wide-angle end.
Figure 11B:
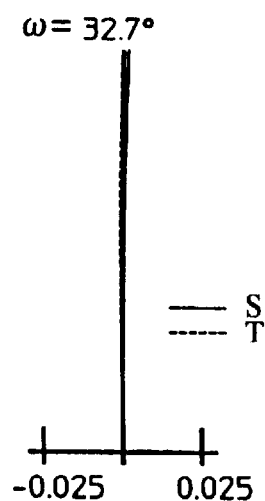
Figure 11C:
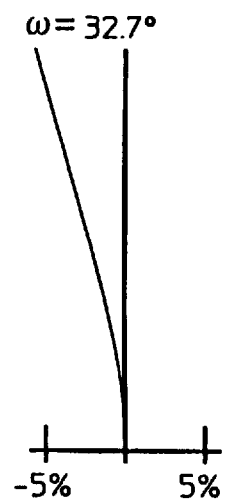
Figure 11D:
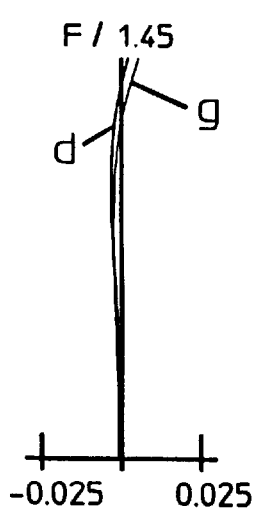
FIGS. 11D–11F show the spherical aberration, astigmatism, and distortion, respectively, of the main lens with the attachment lens of Embodiment 3 attached when at a mid-position.
Figure 11E:
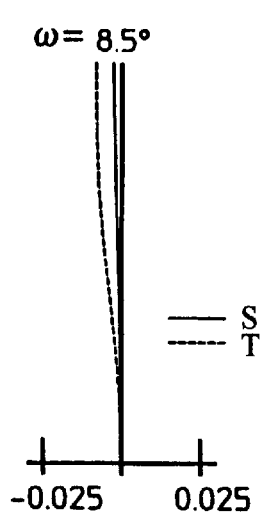
Figure 11F:
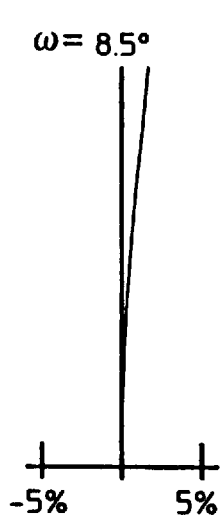
Figure 11G:
FIGS. 11G–11I show the spherical aberration, astigmatism, and distortion, respectively, of the main lens with the attachment lens of Embodiment 3 attached when at the telephoto end.
Figure 11H:
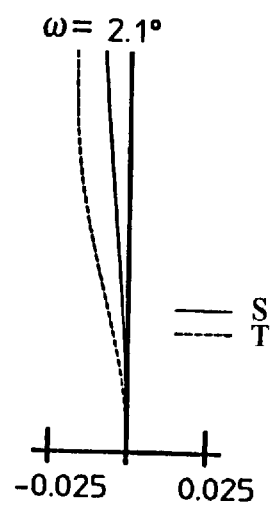
Figure 11I:
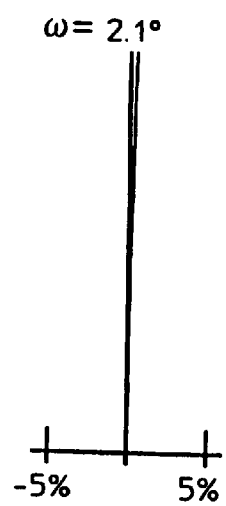

FIGS. 11A–11C show the spherical aberration, astigmatism, and distortion, respectively, of the main lens with the attachment lens of Embodiment 3 attached when at the wide-angle end, FIGS. 11D–11F show these aberrations, respectively, at the mid-position, and FIGS. 11G–11I show these aberrations, respectively, at the telephoto end. In these figures ω is the half-image angle. The spherical aberration is given for both the d and the g lines, and the astigmatism is given for both the sagittal S and tangential T image planes. As is apparent from comparing FIG. 14C with FIG. 11C, whereas the image angle 2ω at the wide-angle end of the main lens alone is 65.0°, when the lens of this embodiment is combined with the main lens as described above, the image angle 2ω at the wide-angle end is 65.4°. Thus, the image angle 2ω stays about the same when the attachment lens AL of this embodiment is attached, and the aberrations of the attachment lens are favorably corrected.

Embodiment 4

Figure 7:
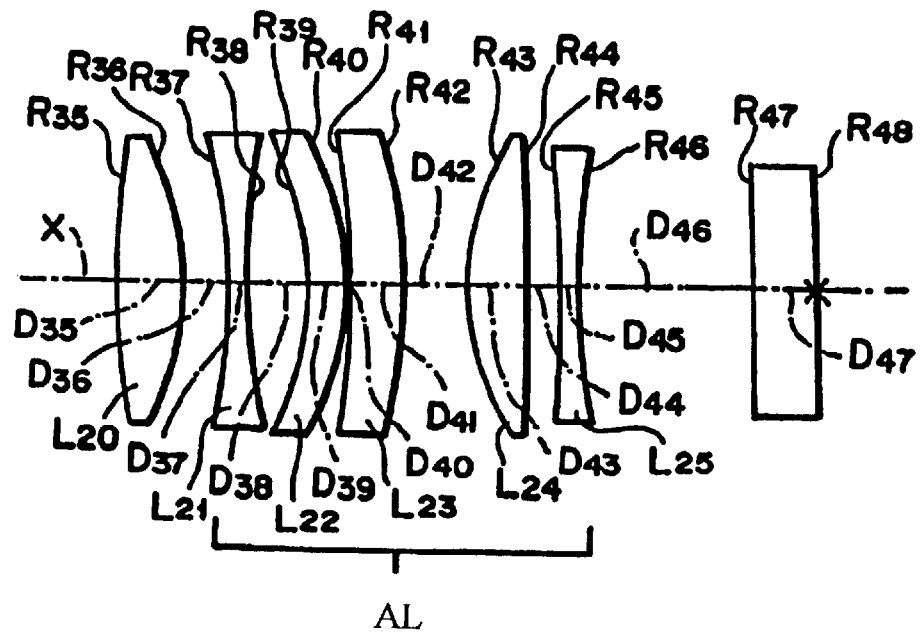
FIG. 7 shows the basic lens element configuration of the adaptor lens of Embodiment 4.

FIG. 7 shows the basic lens element configuration of the adaptor lens of Embodiment 4. The adaptor lens of this embodiment has the same basic lens element configuration as that of Embodiment 2.

Table 5 below lists the surface number #, in order from the object side, the radius of curvature R (in mm) of each surface, the on-axis spacing D (in mm) between surfaces, as well as the index of refraction $N_d$ and the Abbe number $v_d$ (both at the d line) of each optical element of an adaptor lens AL according to Embodiment 4 of the present invention, with the surface numbers listed being in order from the object side as counted from the first surface of the main lens, discussed above. In the middle portion of the table are listed the focal length f of the overall combination of the adaptor lens AL of this embodiment when attached to the main lens ML discussed above and the spacing D36 from the last lens element surface of the main lens to the first lens surface of the adaptor lens at each of the wide-angle end W, the mid-position M, and the telephoto end T. In the bottom portion of the table are listed the values which correspond to Conditions (1) and (2) above.

TABLE 5

| # | R | D D36 | $N_d$ | $v_d$ |
|---|---|---|---|---|
| 37 | −5.700 | 0.15 | 1.64769 | 33.9 |
| 38 | 6.463 | 0.54 | | |
| 39 | −2.940 | 0.33 | 1.58913 | 61.2 |
| 40 | −2.828 | 0.02 | | |
| 41 | −10.703 | 0.50 | 1.71300 | 53.9 |
| 42 | −5.057 | 0.55 | | |
| 43 | 2.460 | 0.50 | 1.81600 | 46.7 |
| 44 | −99.593 | 0.30 | | |
| 45 | −18.788 | 0.17 | 1.75519 | 27.5 |
| 46 | 6.637 | 1.53 | | |
| 47 | ∞ | 0.55 | 1.51680 | 64.1 |
| 48 | ∞ | | | |

| | f | D36 |
|---|---|---|
| W: | 0.73 | 0.37 |
| M: | 2.91 | 0.37 |
| T: | 12.01 | 0.37 |

| Condition (1) value: $|fL_{A1}/f|$ | = | 0.93 |
|---|---|---|
| Condition (2) value: $|fL_{A4}/fL_{A5}|$ | = | 0.46 |

As is apparent from comparing the above values with the limits given in Conditions (1)–(4), this embodiment meets Conditions (1) and (2), as well as the more stringent Conditions (3) and (4).

Figure 12A:
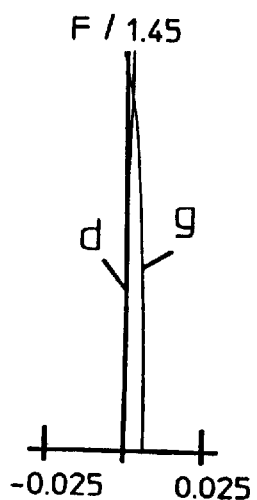
FIGS. 12A–12C show the spherical aberration, astigmatism, and distortion, respectively, of the main lens with the attachment lens of Embodiment 4 attached when at the wide-angle end.
Figure 12B:
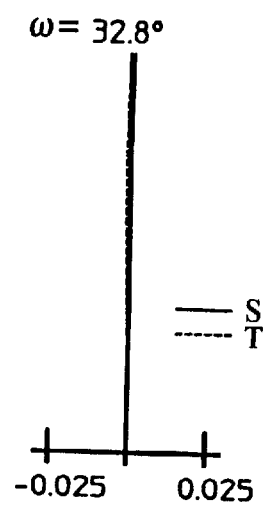
Figure 12C:
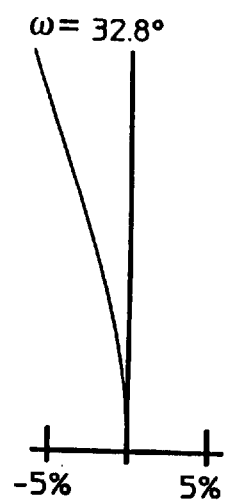
Figure 12D:
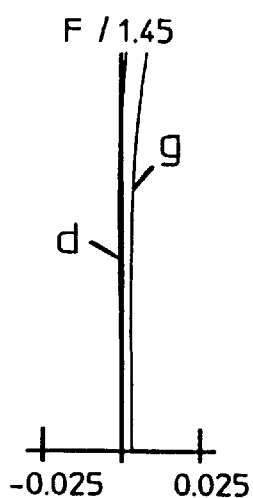
FIGS. 12D–12F show the spherical aberration, astigmatism, and distortion, respectively, of the main lens with the attachment lens of Embodiment 4 attached when at a mid-position.
Figure 12E:
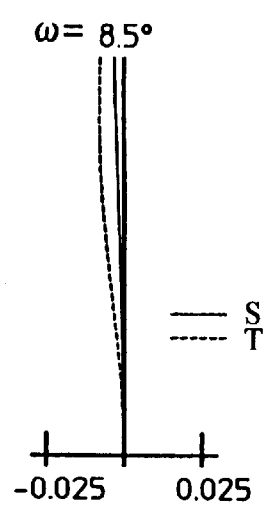
Figure 12F:
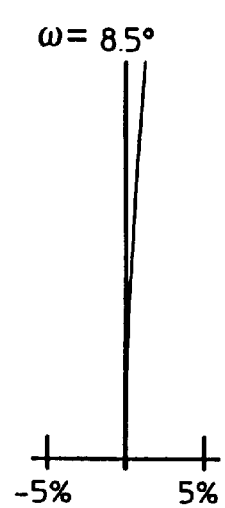
Figure 12G:
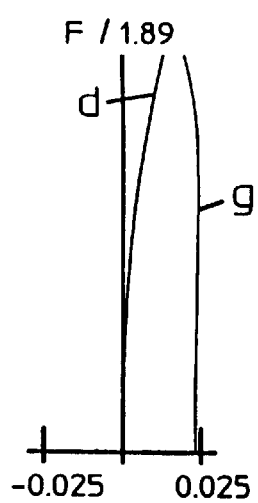
FIGS. 12G–12I show the spherical aberration, astigmatism, and distortion, respectively, of the main lens with the attachment lens of Embodiment 4 attached when at the telephoto end.
Figure 12H:
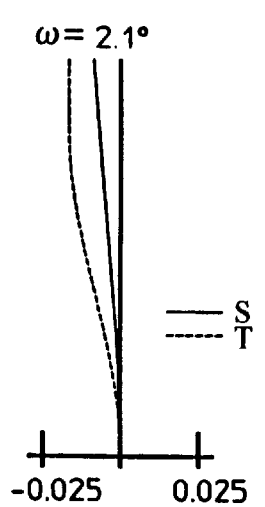
Figure 12I:
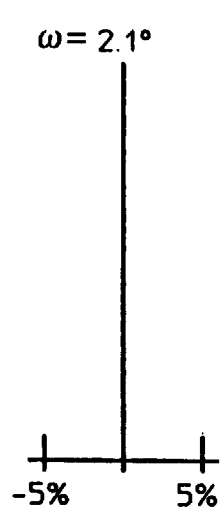

FIGS. 12A–12C show the spherical aberration, astigmatism, and distortion, respectively, of the main lens with the attachment lens of Embodiment 4 attached when at the wide-angle end, FIGS. 12D–12F show these aberrations, respectively, at the mid-position, and FIGS. 12G–12I show these aberrations, respectively, at the telephoto end. In these figures ω is the half-image angle. The spherical aberration is given for both the d and the g lines, and the astigmatism is given for both the sagittal S and tangential T image planes. As is apparent from comparing FIG. 14C with FIG. 12C, whereas the image angle 2ω at the wide-angle end of the main lens alone is 65.0°, when the lens of this embodiment is combined with the main lens as described above, the image angle 2ω at the wide-angle end is 65.6°. Thus, the image angle 2ω stays about the same when the attachment lens AL of this embodiment is attached, and the aberrations of the attachment lens are favorably corrected.

Embodiment 5

Figure 8:
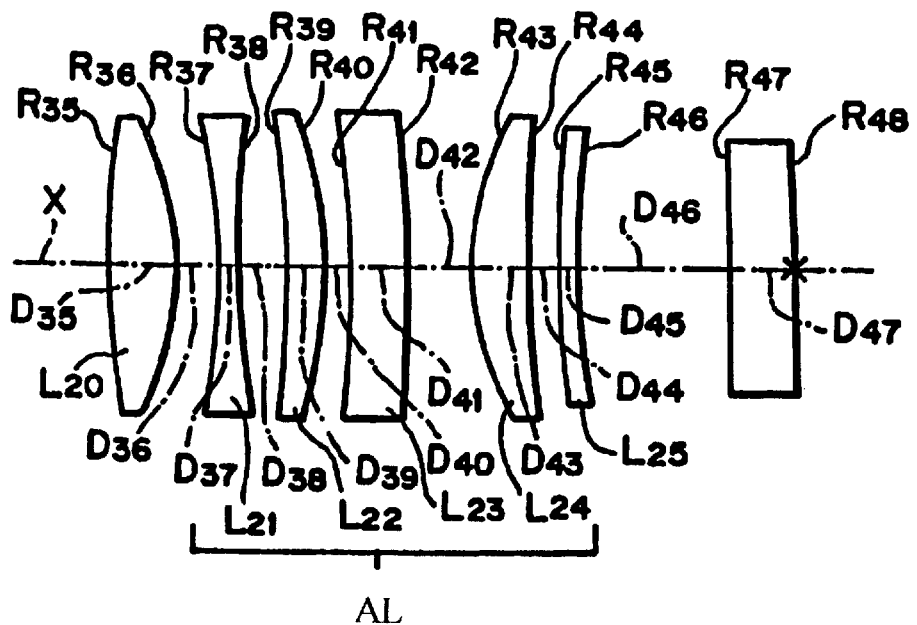
FIG. 8 shows the basic lens element configuration of the adaptor lens of Embodiment 5.

FIG. 8 shows the basic lens element configuration of the adaptor lens of Embodiment 5. The adaptor lens of this embodiment is about the same construction as that of Embodiment 3, except that lens element $L_{24}$ of this embodiment is a positive meniscus lens with its convex surface on the object side, and the lens element $L_{25}$ is a negative meniscus lens with its convex surface on the object side.

Table 6 below lists the surface number #, in order from the object side, the radius of curvature R (in mm) of each surface, the on-axis spacing D (in mm) between surfaces, as well as the index of refraction $N_d$ and the Abbe number $v_d$ (both at the d line) of each optical element of an adaptor lens AL according to Embodiment 5 of the present invention, with the surface numbers listed being in order from the object side as counted from the first surface of the main lens, discussed above. In the middle portion of the table are listed the focal length f of the overall combination of the adaptor lens AL of this embodiment when attached to the main lens ML discussed above and the spacing D36 from the last lens element surface of the main lens to the first lens surface of the adaptor lens at each of the wide-angle end W, the mid-position M, and the telephoto end T. In the bottom portion of the table are listed the values which correspond to Conditions (1) and (2) above.

TABLE 6

| # | R | D D36 | $N_d$ | $v_d$ |
|---|---|---|---|---|
| 37 | −5.803 | 0.15 | 1.67269 | 32.2 |
| 38 | 8.356 | 0.44 | | |
| 39 | −8.768 | 0.33 | 1.71300 | 53.9 |
| 40 | −3.992 | 0.22 | | |
| 41 | −11.081 | 0.50 | 1.51454 | 54.6 |
| 42 | −16.665 | 0.55 | | |
| 43 | 2.524 | 0.50 | 1.81600 | 46.7 |
| 44 | 13.923 | 0.27 | | |
| 45 | 11.780 | 0.17 | 1.71735 | 29.5 |
| 46 | 7.653 | 1.35 | | |
| 47 | ∞ | 0.55 | 1.51680 | 64.1 |
| 48 | ∞ | | | |

| | f | D36 |
|---|---|---|
| W: | 0.73 | 0.37 |
| M: | 2.91 | 0.37 |
| T: | 12.01 | 0.37 |

| Condition (1) value: $|fL_{A1}/f|$ | = | 1.06 |
|---|---|---|
| Condition (2) value: $|fL_{A4}/fL_{A5}|$ | = | 0.12 |

As is apparent from comparing the above values given in the lower portion of the table with the limits given in Conditions (1) and (2), this embodiment meets both Conditions (1) and (2).

Figure 13A:
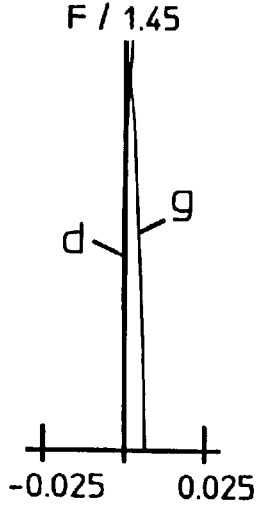
FIGS. 13A–13C show the spherical aberration, astigmatism, and distortion, respectively, of the main lens with the attachment lens of Embodiment 5 attached when at the wide-angle end.
Figure 13B:
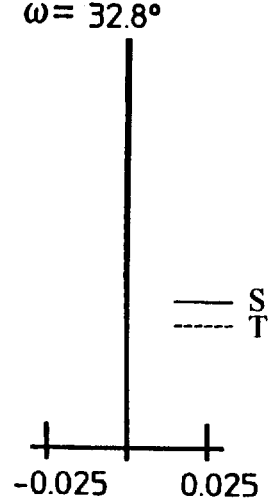
Figure 13C:
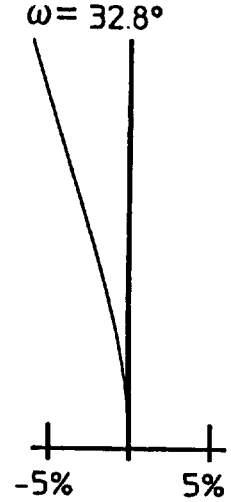
Figure 13D:
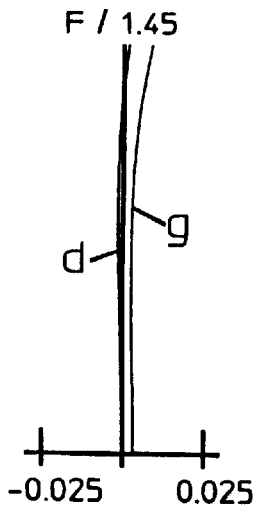
FIGS. 13D–13F show the spherical aberration, astigmatism, and distortion, respectively, of the main lens with the attachment lens of Embodiment 5 attached when at a mid-position.
Figure 13E:
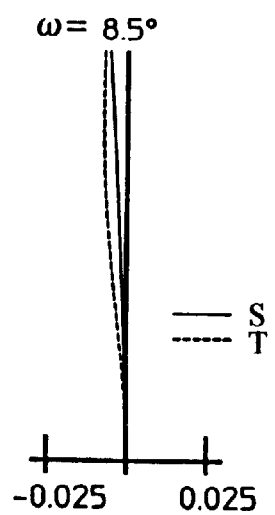
Figure 13F:
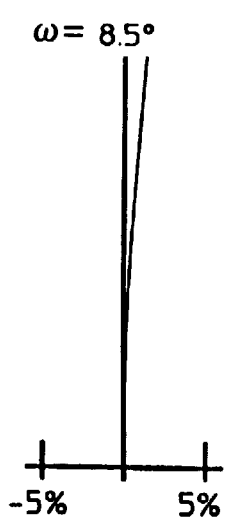
Figure 13G:
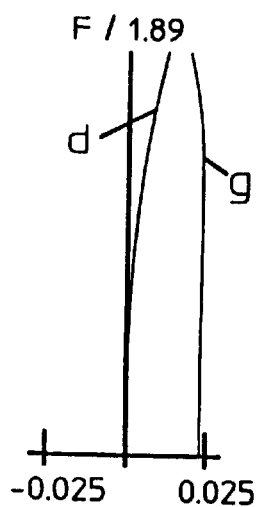
FIGS. 13G–13I show the spherical aberration, astigmatism, and distortion, respectively, of the main lens with the attachment lens of Embodiment 5 attached when at the telephoto end.
Figure 13H:
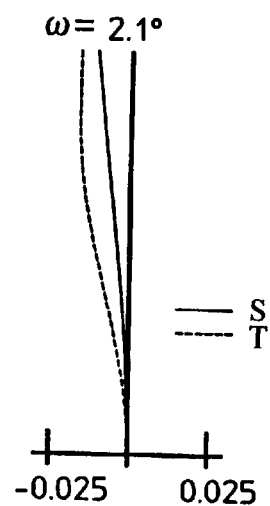
Figure 13I:
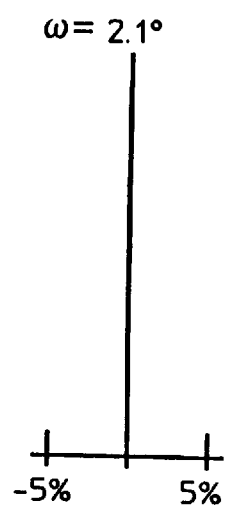

FIGS. 13A–13C show the spherical aberration, astigmatism, and distortion, respectively, of the main lens with the attachment lens of Embodiment 5 attached when at the wide-angle end, FIGS. 13D–13F show these aberrations, respectively, at the mid-position, and FIGS. 13G–13I show these aberrations, respectively, at the telephoto end. In these figures ω is the half-image angle. The spherical aberration is given for both the d and the g lines, and the astigmatism is given for both the sagittal S and tangential T image planes. As is apparent from comparing FIG. 14C with FIG. 13C, whereas the image angle 2ω at the wide-angle end of the main lens alone is 65.0°, when the lens of this embodiment is combined with the main lens as described above, the image angle 2ω at the wide-angle end is 65.6°. Thus, the image angle 2ω stays about the same when the attachment lens AL of this embodiment, and the aberrations of the attachment lens are favorably corrected.

The invention being thus described, it will be obvious that the same may be varied in many ways. For example, the adaptor lens of the present invention is not limited to those set forth in the various embodiments, as various modifications are possible. For example, the radius of curvature R and surface spacings D may be readily scaled, and the types of lens element material may be changed upon necessity. Such variations are not to be regarded as a departure from the spirit and scope of the invention. Further, the attachment lens of the present invention is not limited for use with adapting a zoom lens to a different camera body film size than the camera body film size for which the zoom lens was originally designed, as it can also be used to adapt a fixed-focus lens to different camera body film size than the camera body film size for which the fixed-focus lens was originally designed. Rather the scope of the invention shall be defined as set forth in the following claims and their legal equivalents. All such modifications as would be obvious to one skilled in the art are intended to be included within the scope of the following claims.

What is claimed is:

1. An adaptor lens, for attachment between a lens of a camera and a camera body, in order to provide the camera, with adaptor lens attached, a smaller effective screen size than the camera without the adaptor lens attached, said adaptor lens formed of, in order from the object side:

a front lens group; and a rear lens group; wherein
the front lens group is formed of, in sequential order from the object side without any intervening lens element, a negative lens element and at least one meniscus lens element with its concave surface on the object side; and
the rear lens group is formed of, in sequential order from the object side, a positive lens element with a convex surface on the object side, and a negative lens element.

2. The adaptor lens as described in claim 1, wherein the following condition is satisfied:

$$0.5 \leq |fL_{A1}/f| \leq 1.4$$

where $fL_{A1}$ is the focal length of the first lens element of the first lens group of the adaptor lens, in order from the object side, and f is the focal length of the adaptor lens.

3. The adaptor lens as described in claim 1, wherein the following condition is satisfied:

$$0.1 \leq |fL_{A4}/fL_{A5}| \leq 0.7$$

where $fL_{A4}$ is the focal length of the fourth lens element of the adaptor lens, in order from the object side, $fL_{A5}$ is the focal length of the fifth lens element of the adaptor lens, in order from the object side.

4. The adaptor lens as described in claim 2, wherein the following condition is satisfied:

$$0.1 \leq |fL_{A4}/fL_{A5}| \leq 0.7$$

where $fL_{A4}$ is the focal length of the fourth lens element of the adaptor lens, in order from the object side, $fL_{A5}$ is the focal length of the fifth lens element of the adaptor lens, in order from the object side.

5. An adaptor lens, for attachment between a lens of a camera and a camera body, in order to provide the camera, with adaptor lens attached, a smaller effective screen size than the camera without the adaptor lens attached, said adaptor lens is formed of, in order from the object side:

a front lens group; and a rear lens group; wherein
the front lens group is formed of, in sequential order from the object side, a negative lens element and at least one meniscus lens element with its concave surface on the object side;
the rear lens group is formed of, in sequential order from the object side, a positive lens element with a convex surface on the object side, and a negative lens element; and
the following condition is satisfied $$0.5 \leq |fL_{A1}/f| \leq 1.4$$

where $fL_{A1}$ is the focal length of the first lens element of the first lens group of the adaptor lens, in order from the object side, and f is the focal length of the adaptor lens.

6. An adaptor lens, for attachment between a lens of a camera and a camera body, in order to provide the camera, with adaptor lens attached, a smaller effective screen size than the camera without the adaptor lens attached, said adaptor lens formed of, in order from the object side:

a front lens group; and a rear lens group; wherein
the front lens group is formed of, in sequential order from the object side, a negative lens element and at least one meniscus lens element with its concave surface on the object side;
the rear lens group is formed of, in sequential order from the object side, a positive lens element with a convex surface on the object side, and a negative lens element; and
the following condition is satisfied $$0.1 \leq |fL_{A4}/fL_{A5}| \leq 0.7$$

where $fL_{A4}$ is the focal length of the fourth lens element of the adaptor lens, in order from the object side, and $fL_{A5}$ is the focal length of the fifth lens element of the adaptor lens, in order from the object side.

7. The adaptor lens as described in claim 5, wherein the following condition is satisfied:

$$0.1 \leq |fL_{A4}/fL_{A5}| \leq 0.7$$

where $fL_{A4}$ is the focal length of the fourth lens element of the adaptor lens, in order from the object side, and $fL_{A5}$ is the focal length of the fifth lens element of the adaptor lens, in order from the object side.

* * * * *

UNITED STATES PATENT AND TRADEMARK OFFICE
CERTIFICATE OF CORRECTION

PATENT NO. : 6,556,355 B2
DATED : April 29, 2003
INVENTOR(S) : Tsutsumi

It is certified that error appears in the above-identified patent and that said Letters Patent is hereby corrected as shown below:

Column 1,
Line 59, change "a shows" to -- shows --;

Column 3,
Line 36, change "form" to -- from --;

Column 6,
In the heading of Table 2, change the middle column heading to -- D --;
In the first line of Table 2, insert the following value into the middle column:
-- D36 --;

Column 7,
In the heading of Table 3, change the middle column heading to -- D --;
In the first line of Table 3, insert the following value into the middle column:
-- D36 --;

Column 8,
In the heading of Table 4, change the middle column heading to -- D --;
In the first line of Table 4, insert the following value into the middle column:
-- D36 --;

Column 9,
In the heading of Table 5, change the middle column heading to -- D --;
In the first line of Table 5, insert the following value into the middle column:
-- D36 --;

Column 10,
In the heading of Table 6, change the middle column heading to -- D --;
In the first line of Table 6, insert the following value into the middle column:
-- D36 --;
Line 58, change "embodiment" to -- embodiment is attached --; and

UNITED STATES PATENT AND TRADEMARK OFFICE
CERTIFICATE OF CORRECTION

PATENT NO. : 6,556,355 B2
DATED : April 29, 2003
INVENTOR(S) : Tsutsumi

It is certified that error appears in the above-identified patent and that said Letters Patent is hereby corrected as shown below:

Column 11,
Line 8, change "Rather the" to -- Rather, the --.

Signed and Sealed this

First Day of July, 2003

JAMES E. ROGAN
*Director of the United States Patent and Trademark Office*